United States Patent [19]

Toonen

[11] Patent Number: 5,456,936

[45] Date of Patent: Oct. 10, 1995

[54] FROZEN LOW CALORIE DAIRY CONFECTION

[75] Inventor: Anthony W. Toonen, Green Bay, Wis.

[73] Assignee: Good Humor Corporation, Green Bay, Wis.

[21] Appl. No.: 282,125

[22] Filed: Jul. 28, 1994

[51] Int. Cl.[6] .................................................. A23G 9/02
[52] U.S. Cl. .......................................... 426/567; 426/565
[58] Field of Search ............................. 426/565, 566, 426/567, 586, 583, 804

[56] References Cited

U.S. PATENT DOCUMENTS

| | | | |
|---|---|---|---|
| 2,978,446 | 4/1961 | Battista | 426/658 |
| 3,157,518 | 11/1964 | Battista | 426/658 |
| 3,539,365 | 11/1970 | Durand | 426/573 |
| 4,264,637 | 4/1981 | Braverman | 426/573 |
| 4,374,861 | 2/1983 | Tzecieski | 426/42 |
| 4,497,841 | 2/1985 | Wudel et al. | 426/565 |
| 4,643,906 | 2/1987 | Pitz | 426/565 |
| 4,853,246 | 8/1989 | Stevens | 426/580 |
| 4,855,156 | 8/1989 | Singer | 426/565 |
| 4,857,352 | 8/1989 | Miller | 426/548 |
| 4,959,227 | 9/1990 | Amer | 426/35 |
| 5,093,137 | 3/1992 | Shazer, Jr. et al. | 426/42 |
| 5,209,942 | 5/1993 | Bauer | 426/573 |

FOREIGN PATENT DOCUMENTS 961398  6/1964  United Kingdom .

*Primary Examiner*—Jeanette Hunter
*Attorney, Agent, or Firm*—James J. Farrell

[57] ABSTRACT

A substantially lactose- and sugar-free, low calorie, frozen dairy confection having a 20% to 100% overrun is disclosed. The composition critically contains anhydrous milk fat and low- or no-lactose ultrafiltered milk protein concentrate coupled with selected flavoring agents.

9 Claims, No Drawings

FROZEN LOW CALORIE DAIRY CONFECTION

FIELD OF THE INVENTION

This invention relates to a frozen dairy confection and, more particularly, to a substantially lactose and sugar free product which contains a relatively high water content.

BACKGROUND OF THE INVENTION

There are an increasing number of people who cannot tolerate milk products. The principal reason for this intolerance is lactase deficiency. Lactase is the intestinal enzyme needed for proper digestion of lactose, the major sugar contained in milk. Lactose digestion takes place in the intestines, but if it is not digested, it passes unchanged into the colon. When this occurs, bacteria residing in the colon cause the lactose to ferment, creating various gases. Thus, those persons suffering from lactase deficiency experience such symptoms as bloating, cramps, diarrhea, and gas when they ingest dairy products. Even though many non-dairy products have been developed, there has been a lack of substantially lactose and sugar free frozen dairy confection products which have the texture, body, flavor and palatability of products using milk.

SUMMARY OF THE INVENTION

The novel frozen dairy confection is prepared from commercial products, along with protein, suitable sweeteners, and flavoring. The product may be readily frozen and has the keeping characteristics of conventional products. Because the product is substantially free of lactose, it may be ingested by those persons having lactase deficiency without incurring many of the undesirable effects of lactose containing commercial products.

It is, therefore, a general object of this invention to provide a novel substantially lactose and sugar-free product which has the taste, appearance, palatability, and aroma of conventional products.

A more specific object of this invention is to provide a novel product and method of making it which includes as its principal ingredients, selected dairy products which are low in lactose or contain no lactose.

Accordingly, the above objectives are substantially met by a substantially lactose and sugar-free low calorie frozen dairy confection having about 20 to 100% overrun comprising a lowcalorie sweetener in an amount of about 0.005% to 1%; a bulking agent or a microcrystalline cellulose or mixture of these in an amount of about 10% to 20%; anhydrous milk fat in an amount of about 1% to 10%; a substantially lactose-free milk protein concentrate in an amount of about 3% to 7%; preferably the milk protein is ultrafiltered, flavoring agents; stabilizers, including microcrystalline cellulose; emulsifiers; buffering agents; water in an amount of 65% to 80%.

DESCRIPTION OF THE PREFERRED EMBODIMENT

In accordance with the present invention, a novel substantially lactose and sugar-free product is prepared by blending selected lactose-free commercial dairy products, carbohydrates, or starch bulking agents and selected stabilizers, emulsifiers and buffering agents to form a homogenized mixture which is then treated to create overrun and frozen. Suitable flavoring may be added to impart the desired flavor to the product. It has been found that this novel product has all of the characteristics, including taste, appearance, palatability, aroma, and keeping qualities as do commercial products which are made from milk.

Conventional frozen dairy confections are made from a combination of milk products, including cream, butter, butterfat, or milk in one of its various forms: whole fluid milk, evaporated milk, skim milk, condensed milk, sweetened dried milk, or dried skim milk. These milk products, for the most part, contain various concentrations of lactose and cannot be ingested by lactase deficient persons. The present product uses substantially lactose-free dairy products which include anhydrous milk fat and ultrafiltered milk protein. In this way, many, if not most, of the attributes of milk can be retained while eliminating most, if not all, of the lactose in the milk. By lactose-free or substantially lactose-free as used herein, is meant milk protein containing a maximum of about 4% of lactose, preferably the milk protein is ultrafiltered.

In the past, lactose-reduced ice cream products have been proposed, for example in U.S. Pat. Nos. 4,374,861 and 4,643,906, and microcrystalline cellulose has also been used in frozen confections, see U.S. Pat. Nos. 4,264,637 and 4,857,352. None of these formulations have been completely satisfactory to accomplish applicants' goals. U.S. Pat. No. 4,855,156 employs a specific protein in a whipped frozen dessert product. The removal of most of the lactose and the use of the combination of anhydrous milk fat and ultrafiltered milk protein instead of full milk products, coupled with the high water content and sugar replacement, necessitated a careful blend of bulking agents, stabilizing and emulsifying agents, buffering agents and flavorants to approximate the texture, mouth feel and other organoleptic qualities of frozen dairy desserts using simply sucrose and milk. The anhydrous milk fat must be appropriately emulsified thus requiring selected combinations of emulsifiers. In addition, selected gums and soybean protein isolates must be used to achieve appropriate texture. The high water content requires a sufficient amount of the gums to maintain it as part of the overall system rather than allowing the water to form ice crystals. Cellulose gums with microcrystalline cellulose and selected polyols as bulking agents are required to take the place of the sugar that is left out and various combinations of flavorants must be used to offset the lactose and sucrose sugars that have been removed.

Typical emulsifying agents may be phospholipids and proteins or esters of long chain fatty acids and a polyhydric alcohol. Fatty acid esters of glycerol, potyglycerol esters of fatty acids, sorbitan esters of fatty acids and polyoxyethylene and polyoxypropylene esters of fatty acids may be used but organoleptic properties, of course, must be considered. Mono- and di-glycerides are preferred. Emulsifiers are used in amounts of about 0.03% to 0.2%, preferably 0.05% to 0.1%.

Soybean protein isolates combined with modified food starches such as Ultrafreeze 400C® obtained from A. E. Staley Manufacturing Co. assist in texturizing the product and are used in amounts of 0.5% to 3.0%, preferably 0.75% to 2.0%.

Gum stabilizers are particularly effective in controlling viscosity, providing mouth feel and improving whipping (aerating) properties; to provide a protective colloid to stabilize proteins to heat processing; to modify the surface chemistry of fat surfaces to minimize creaming; to provide acid stability to protein systems and; to increase freeze-thaw stability. Gums can be classified as neutral and acidic, straight- and branched-chain, gelling and non-gelling. The principal gums that may be used are locust bean gum, carageenan, xanthan, guar and carboxymethyl cellulose, all of which are disclosed in U.S. Pat. No. 5,209,942, hereby incorporated by reference.

Gums are generally used in concentrations of 0.02–0.5 wt. % of the composition or 1–6 wt. % of the protein level. Because of differing functionalities, combinations of gums provide a better product than a single gum.

The stabilizer is a key ingredient in these unique compositions. It must have at least two components, one of which is necessarily microcrystalline cellulose as described in U.S. Pat. No. 5,209,942, e.g., Avicel 581, which is activated or "peptized". Microcrystalline cellulose is cellulose crystallite aggregates with a level-off D.P. Level-off DP is the average level-off degree of polymerization measured in accordance with the paper by O. A. Battista entitled: "Hydrolysis and Crystallisation of Cellulose". Vol. 42, pages 502 to 507, *Industrial and Engineering Chemistry*, 1950. An example of microcrystalline cellulose is the water-dispersible cellulose crystallite aggregates described for use in food compositions in British Pat. No. 961 398 (Also cf. U.S. Patent Nos. 2,978,446; 3,157,518 and 3,539,365). A combination of microcrystalline cellulose and sodium carboxymethyl cellulose (CMC) gives particularly good results, and the microcrystalline cellulose is preferably a material in which the particles are themselves coated with 10 percent (by weight of the material) of sodium carboxymethyl cellulose. The sodium carboxymethyl cellulose used for coating is preferably one of medium viscosity, that is one which, in 1 percent aqueous dispersion, has a viscosity of from 300 to 1000 centipoises at 20° C.

Microcrystalline cellulose has been listed in the *Fourth Supplement to the Food Chemicals Codes*, First Edition, by the National Academy of Sciences-National Research Council as: Cellulose, Microcrystalline (cellulose gel).

The other component comprises one or any combination of carboxymethylcellulose (in addition to that with which the microcrystalline cellulose may be coated), xanthan gum, starch and alginate.

Certain salts such as phosphates and chlorides are employed to alter the buffering capacity of the system and to improve the water binding capacity of proteins and improve solubility and flavor. Sodium chloride and sodium monophosphate at very low levels are preferred but calcium phosphate and particularly monocalcium phosphate may also be employed. Sodium chloride at 0.05% to 0.3%; and sodium monophosphate at 0.01% to 0.1%. The bulking agents employed must have only trace amounts of mono- and disaccharides. Conventional bulking agents such as polydextrose, maltodextrose, sugar alcohols or starches may be used. The bulking agents are used in amounts of about 10% to 20%, preferably 13% to 16%.

The sweetener may be any of the artificial sweeteners well known in the art such as aspartame, saccharine, Alitame® (obtainable from Pfizer), acesulfame K, obtainable from Hoechst, cyclamates and the like. Aspartame is preferred. The sweeteners are used in varying amounts of about 0.005% to 1%, preferably 0.007% to 0.73% depending on the sweetener, for example. Aspartame may be used at a level of 0.05% to 0.15%, it is preferred at a level of 0.07% to 0.11%. Acesulfame K is preferred at a level of 0.09% to 0.15%.

Glycerol is used to control ice formation. Sorbitol may also be employed but glycerol is preferred. The glycerol is used in an amount of about 1% to 5%, preferably 2.5% to 4.0%.

Flavorings are preferably added to the product but only in amounts that will impart a mild, pleasant flavor. Since the present frozen dairy product does not contain full milk components, such as cream, there is a need to approximate the natural flavor of such cream. The flavoring may be any of the commercial flavors employed in ice cream, such as varying types of cocoa, pure vanilla or artificial flavor, such as vanillin, ethyl vanillin, chocolate, extracts, spices and the like. It will further be appreciated that many flavor variations may be obtained by combinations of the basic flavors. Such is not in any way critical to the present invention, and their selection as optional ingredients depends on particular flavor requirements and consumer demands. The confection compositions are flavored to taste as mentioned above. Suitable flavorants may also include seasoning, such as salt, and imitation fruit or chocolate flavors either singly or in any suitable combination.

Processes used for the manufacture of the product are essentially the same as for their full dairy product counterparts. The processes common to all such products include: ingredient blending, pumping, pasteurization, homogenization, cooling, aeration, freezing and packaging. Products can be manufactured by batch or by continuous processes. Ingredients may be either liquid or dry, or a combination of both. Liquid ingredients can be blended by the use of positive metering pumps to a mixing tank or by in-line blending. Dry ingredients must be hydrated during the blending operations. This is most commonly accomplished by the use of turbine mixers in processing vats or by incorporating the dry material through a high speed, centrifugal pump. The blending temperature depends upon the nature of the ingredients, but it must be above the melting point of any fat and sufficient to fully hydrate gums used as stabilizers and proteins. Pasteurization is generally carried out in high temperature short time (HTST) units, in which the homogenizer is integrated into the pasteurization system.

In the process of the invention, it is critical that the protein and microcrystalline cellulose be fully hydrated before adding other components which might interfere with the hydration.

Having generally described various aspects of the present invention, the invention will now be more particularly described with reference to the following specific examples. All parts, percentages and proportions herein and in the appended claims are by weight unless otherwise indicated.

EXAMPLE 1

A typical prior art formulation is as follows:

| INGREDIENTS | % WT. |
| --- | --- |
| Water | 74.77 |
| Skim Milk Powder | 12 |
| Maltrin 100[1] | 7 |
| Cocoa | 4 |
| Milk fat | 1 |
| Avicel 581 | 0.50 |
| Citric Acid | 0.01 |
| Emulsifier[2] | 0.25 |
| Stabilizer[3] | 0.35 |
| Vanillin | 0.02 |
| Aspartame | 0.01 |

Time/Temperature

-continued

| | |
|---|---|
| Water Temperature | 180° F. |
| Final Batch Temperature | 144° F. |
| Total Mixing Time | 32 min. |

OVERRUN

| | |
|---|---|
| Cup Weight | 220 |
| Overrun | 40% |

[1]IODE maltodextrin
[2]Mono & diglycerides
[3]Cellulose gum locust bean gum

The freeze mix is aerated to about 40% overrun to a temperature and consistency to allow filling of molds. The bars are dip finished prior to wrapping in white wraps and hardened in a −25° F. blast freezer.

EXAMPLE 2

Three formulations of the invention, A, B, and C, are prepared with the following compositions:

FORMULATIONS

| | INGREDIENTS | A - (15) | B - (15) | C - (17) |
|---|---|---|---|---|
| 1 | Water | 71.4 | 71.43 | 71.4 |
| 2 | Avicel 581 | 0.50 | 0.50 | 0.50 |
| 3 | Stabizer Blend[1] | 0.25 | 0.25 | 0.25 |
| 4 | Milk Protein Concentrate | — | — | 4.30 |
| 5 | Total Milk Protein | 4.00 | 4.00 | — |
| 6 | Sorbitol | 1.50 | — | — |
| 7 | Polydextrose | 6.50 | 6.50 | 6.50 |
| 8 | Glycerol | 1.57 | 3.13 | 3.13 |
| 9 | Maltrin 100[2] | 8.25 | — | 7.95 |
| 10 | Maltrin 040[3] | — | 8.25 | — |
| 11 | Cocoa | 3.52 | 3.52 | 3.52 |
| 13 | Flavor | 0.35 | 0.35 | — |
| 13 | Salt | | | 0.15 |
| 14 | $Ca(H_2P-O_4)_2-H_2O$ | | | 0.07 |
| 15 | Vanilla Flavor | | | 0.02 |
| 16 | Malt Powder | | | 0.10 |
| 17 | Ultrafreeze 400[4] | 1.00 | 1.00 | 1.00 |
| 18 | Milkfat[5] | 1.00 | 1.00 | 1.00 |
| 19 | Aspartame | 0.11 | 0.11 | 0.11 |
| 20 | Citric Acid | 0.01 | 0.01 | 0.01 |

PROCESSING

| | A - (15) | B - (15) | C - (17) |
|---|---|---|---|
| Water Temperature | 190° F. | 180° F. | 180° F. |
| Order or Addition (#'s) | 1, 2, 3–5 min., 5-5 min. 6, 7, 8, 9, 11, 12, 13, 18, 19, 20 | 1, 2, 3–5 min., 5-5 min. 7, 8, 10, 11, 12, 13, 18, 19, 20 | 1, 2, 3–5 min., 4 min. 7, 8, 9, 11, 12, 14, 15, 16, 17, 18, 19, 20, 21 |
| Final Batch Temperature | 170° F. | 160° F. | 154° F. |
| Total Mixing Time | 40 min. | 38 min. | 35 min. |

OVERRUN DATA

| Mix Number | A-15 | B-15 | C-17 |
|---|---|---|---|
| Cup Weight | 222 | 222 | 225 |
| Overrun | 40% | 40% | 39% |

[1]Stabilizer Blend: For 500 grams; Cellulose Gum - 250 grams; mono- and diglyceride - 125 grams; Guar Gum - 50 grams; Locust Bean Gum - 50 grams; Carrageenan - 25 grams.
[2]10 DE - maltodextrin
[3]4 DE - maltodextrin
[4]Modified food starch and soy protein isolate
[5]anhydrous

EXAMPLE 3

A white formulation was prepared as described below. The formulation can employ various flavor systems within the invention.

| INGREDIENTS | % Wt. |
|---|---|
| Water | 73.10 |
| Avicel 581 | 0.50 |
| Stabilizer Blend[1] | 0.25 |
| Milk Protein Concentrate | 4.30 |
| Polydextrose | 7.00 |
| Glycerol | 3.75 |
| Maltrin 100[2] | 9.00 |
| Ultrafreeze 400C[3] | 1.00 |
| Milkfat[4] | 1.00 |
| Aspartame | 0.11 |
| Citric Acid | 0.11 |
| Mix Density | 9.30 |
| Total Mix Weight | 90.33 |

[1]Stabilizer Blend: For 500 grams; Cellulose Gum - 250 grams; Mono and diglycerides - 125 grams; Guar Gum - 50 grams; Locust Bean Gum - 50 grams; Carrageenan - 25 grams.
[2]10 D.E. maltodextrin
[3]Modified food starch and soy protein isolate
[4]Anhydrous Analysis of Examples 2 and 3 show a consumer acceptable frozen dairy confection which is substantially lactose and sugar free.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A substantially lactose and sugar-free low calorie frozen dairy confection having about 20 to 100% overrun comprising:

(a) a low calorie sweetener in an amount of about 0.005% to 1%;

(b) a bulking agent or a microcrystalline cellulose or mixture in an amount of about about 10% to 20%;

(c) anhydrous milk fat in an mount of about 1% to 10%;

(d) a substantially lactose-free milk protein concentrate in an amount of about 3% to 7%;

(e) flavoring agents;

(f) stabilizers, including microcrystalline cellulose;

(g) emulsifiers;

(h) buffering agents;

(i) water in an amount of 65% to 80%;

2. A confection as defined in claim 1 wherein said sweetener is selected from the group consisting of aspartame®, saccharine, alitame®, acesulfame K®, cyclamate and mixtures thereof.

3. A confection as defined in claim 1, wherein said emulsifiers are selected from the group consisting of monoand diglycerides and mixtures thereof.

4. A confection as defined in claim 1, wherein said bulking agent is selected from the group consisting of maltodextrin, polydextrose, glycerol, sorbitol and microcrystalline cellulose.

5. A confection as defined in claim 1 wherein said flavoring agents are selected from the group consisting of cocoa, vanillin, vanilla extract, salt, cream flavor, malt powder and mixtures thereof.

6. A confection as defined in claim 1 wherein said milk protein concentrate is ultrafiltered.

7. A confection as defined in claim 1 wherein said milk protein concentrate has less than 4% lactose and is ultrafiltered.

8. A confection as defined in claim 1 wherein said stabilizers are selected from the group consisting of microcrystalline cellulose, guar gum, locust bean gum, carageenan, xanthan, cellulose gum and mixtures thereof.

9. A confection as defined in claim 1, wherein said buffering agent is monocalcium phosphate.

* * * * *